3,219,430
HERBICIDAL METHOD UTILIZING 2,3,6-TRI-
CHLOROBENZYL 2,4-DICHLOROPHENOXY-
ACETATE
Jack S. Newcomer, Wilson, Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Filed Oct. 5, 1964, Ser. No. 402,066
2 Claims. (Cl. 71—2.6)

This is a continuation-in-part of the parent application, Serial Number 186,844, filed April 12, 1962, now U.S. Patent 3,158,645, which is a division of our co-pending application S.N. 714,951, filed February 13, 1958, now abandoned.

This invention relates to a herbicidal method employing a ring chlorinated benzyl ester.

The present invention resides in the concept of a method for the control of the growth of vegetation by applying an effective amount of 2,3,6-trichlorobenzyl 2,4-dichlorophenoxyacetate to the locus of said vegetation.

There are many types of herbicides in use today which suffer from high production costs, high rates of application needed, short periods of action and difficulty of avoiding damage to desirable plants. The compounds 2,4-dichlorophenoxyacetic acid (2,4-D) and its esters of ordinary alcohols have been used as herbicides, but suffer from shortcomings not present in the compounds of this invention. 2,4-dichlorophenoxyacetic acid can be used as a pre-emergence herbicide only with great danger of damage to standing crops in or near the area of treatment. Further, the pre-emergence effect is short-lived because of microbial destruction of the compound in the soil. Further, many weed species of serious economic importance have proved highly resistant to 2,4-dichlorophenoxyacetic acid and its esters of ordinary alcohols. Such weed species include common turf weeds such as chickweed and sorrel, and common weeds of farmland and hedgerows such as the bindweeds, trumpet vine, and leafy spurge, to name a few.

It is an object of our invention to make available herbicidal methods which allow effective pre-emergence control of weeds with much longer duration of effectiveness than hitherto has been usual. It is a further object of our invention to provide methods for controlling weeds resistant to ordinary alcohol esters of 2,4-D. It is still a further object of our invention to provide methods of general utility for control of weeds.

The objects of our invention are achieved by treating the area to be kept free of weeds with a composition containing as an active ingredient 2,3,6-trichlorobenzyl 2,4-dichlorophenoxyacetate.

The compound employed in the method of our invention is a new composition of matter and is prepared by esterification of 2,3,6-trichlorobenzyl alcohol, or by reaction of 2,3,6-trichlorobenzyl halides with a salt of 2,4-dichlorophenoxyacetic acid, or by transesterification, as is indicated in S.N. 186,844, now U.S. 3,158,645. For commercial applications it may be advantageous to use the easily obtained crude 2,3,6-trichlorobenzyl chloride or 2,3,6-trichlorobenzyl alcohol which is contaminated with 2,4,5- and 2,3,4-trichlorobenzyl chloride or alcohol. We have found that the isomeric products other than the 2,3,6-isomer act essentially as inert contaminants, although in some cases slight synergism may be observed.

This herbicidal composition offers the advantage of compatibility with a host of other herbicides including the tri- and tetrachlorophenylacetic acids, 2,4-D acid and other herbicidal phenoxy aliphatic acids and esters, simazine and other herbicidal triazines, monuron, fenuron, diuron and other herbicidal ureas, petroleum oils, hexachlorocyclopentadiene, pentachlorophenol, dinitro-o-alkylphenols, glycol, trichloroacetates, 2,2-dichloropropionates, with insecticides such as benzene hexachloride and chlordane, and with various adjuvants and diluents well known to the art. Thus, this herbicide may be used by itself or may be made the subject of liquid or solid formulations ranging from simple to complex. For example, if it is desired, this composition may be made the subject of a liquid formulation by diluting, dispersing, dissolving or emulsifying with a surface active adjuvant or combination of these adjuvants in solvents such as petroleum hydrocarbons, ketones, esters or combinations thereof. Alternatively, the novel herbicide may be made up as solid formulations of powders, dusts, wettable powders, granules and pellets using solid diluents such as talcs, clays, flours, starches, diatomaceous earths, mica, alkaline earth limes, carbonates and phosphates either finely divided granular or pelleted in form. Unlike aliphatic and some aromatic acid chlorides, the compound of this invention is relatively stable to water and consequently formulations of this compound can be dispersed in water for spraying without decomposition. These solid and liquid formulations facilitate handling and application and sometimes enhance herbicidal activity to more than an additive degree.

Solutions of the compound of the invention in mineral oils, kerosene, diesel oils, weed oils, and the like are particularly effective, giving rapid and thorough kill of mixed weed populations at rates and costs much lower than would be required in using either component alone. A major advantage of the compound of the invention over related acids and amides is its high solubility in oils, which permits its use as herbicidal oil fortifiers.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. Within the term "surface active agents" are included wetting agents, dispersing agents, emulsifying agents, and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38 (67), 1955. Other sources of adjuvant materials is set forth in Bulletin E–607 of the Bureau of Entomology and Plant Quarantine of the United States Department of Agriculture. Polyoxyethyl esters and ethers are particularly efficaceous emulsifiers for these compositions.

While the manner and method of application of the inventive compositions is varied and largely dependent upon the climatic conditions, crop treated, the weeds to be eradicated, the equipment available and the convenience of the user, a preferred embodiment of this invention is to apply this herbicide as a spray after making it up as a liquid formulation containing, besides the active ingredient, a solvent quantity of petroleum hydrocarbon solvents and oils such as xylene, usually together with small quantities of an emulsifier such as a commercial polyoxyethylene ether and/or an alkylaryl sulfonate. This type of mixture is emulsified with water in any convenient amount and sprayed on the weed population growing amidst the desired crop or other area where weed growth is not desired. Alternatively, this composition may be applied as a solid formulation directly to the ground.

The rate of application cannot be precisely stated due to varying degree of resistance possessed by the weed species and crop, the stage of weed and crop growth, the soil type and climatic conditions, but in general, the rates will be at least one-quarter of a pound of herbicide per acre and for reasons of cost will seldom exceed one hundred pounds per acre with the preferred range falling within one-quarter to fifty pounds per acre. Where the weeds are in an early stage of growth, they being more susceptible, will frequently respond to the rates from one-half to four pounds per acre while older weeds or weeds that are to be totally eradicated from ornamental beds or turf may require rates in excess of four pounds per acre. In those instances where the weed population has been allowed to accumulate unchecked or where mature plants are encountered, applications of up to fifty and even beyond this rate may be required. For eradication of deeply-rooted herbicide-resistant perennial weeds such as field bindweed, rates of ten to one hundred pounds are found best. In oil sprays, concentrations of 0.1 to ten percent of the toxicant in the oil are preferred, the oil being sprayed at the rate of ten to two hundred gallons per acre.

Example 1

The compound 2,3,6-trichlorobenzyl 2,4-dichlorophenoxyacetate was prepared by esterification of 2,3,6-trichlorobenzyl alcohol with 2,4-dichlorophenoxyacetic acid in the presence of toluene and a trace of p-toluenesulfonic acid as esterification catalyst. The reaction mixture was refluxed, the water produced was entrained by the toluene and collected in a Dean-Stark trap until the theoretical amount of water had been collected. The reaction mixture was washed with dilute sodium carbonate solution and the organic layer was dried and recovered. The product had a melting point of 124.5 degrees centigrade. Analysis for chlorine: theory—42.9 percent. Found—42.5 percent.

Example 2

Pre-emergence tests comparing 2,3,6-trichlorobenzyl 2,4-dichlorophenoxyacetate and the known benzyl 2,4-dichlorophenoxyacetate were conducted using various plant species chosen because of convenience of growing uniform stands in the greenhouse and because of similarity of their physiological response to that of principal weed types. The compounds were applied to the freshly seeded soil at the rate of 1 and 2 pounds of compound per acre, using an aqueous spray in which the compound was dispersed. The plants were then permitted to grow in the greenhouse and finally the degree of phytotoxic effect was determined. The ratings two weeks after spraying are given in the following table.

| 2,4-dichloro-phenoxy-acetate ester used | Effect on Indicated Crop | | | | | | |
|---|---|---|---|---|---|---|---|
| | Pounds per acre | Millet | Cucumbers | Ryegrass | Beans | Alfalfa | Tomatoes |
| Benzyl ester | 1 | 3 | 3 | 0 | 3 | 2 | 1 |
| 2,3,6-trichlorobenzene ester | 1 | 7 | 7 | 0 | 9 | 6 | 4 |
| Benzyl ester | 2 | 3 | 3 | 0 | 3 | 4 | 2 |
| 2,3,6-trichlorobenzyl ester | 2 | 9 | 9 | 2 | 10 | 9 | 9 |

Scale: 0=no effect; 1–3=mild repression; 4–6=moderate repression; 7–9=severe repression, most plants in dying condition; 10=complete kill or prevention of emergence.

Example 3

Greenhouse flats containing seedlings of representative plant species, chosen because of their uniformity of growth under greenhouse conditions, namely, tomatoes, cucumbers, and cabbage, were sprayed with aqueous dispersions of the ester of the invention and a related ester at the rate of 0.5 pound of chemical per acre. One week later the flats were inspected and the degree of phytotoxicity recorded, the recordings being as follows:

| Chemical | Ratings on Indicated Species [1] | | |
|---|---|---|---|
| | Tomatoes | Cucumbers | Cabbage |
| 2,3,6-trichlorobenzyl chloroacetate | 0 | 0 | 0 |
| 2,3,6-trichlorobenzyl 2,4-dichlorophenoxyacetate | 8 | 5 | 4 |

[1] Scale—Same as Example 2.

The examples of the compositions of our invention and methods of preparing and utilizing them, which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

We claim:
1. A method for controlling plant growth which comprises applying to the locus to be treated a herbicidal amount of 2,3,6-trichlorobenzyl 2,4-dichlorophenoxyacetate.
2. A method for controlling plant growth which comprises applying to a locus to be treated a phytotoxic quantity of a herbicidal composition including as an active ingredient 2,3,6-trichlorobenzyl 2,4-dichlorophenoxyacetate.

References Cited by the Examiner

UNITED STATES PATENTS

| | | | |
|---|---|---|---|
| 2,322,760 | 6/1943 | Lontz | 71—2.6 |
| 2,396,513 | 3/1946 | Jones | 71—2.6 |
| 2,668,104 | 2/1954 | Eastman. | |
| 2,754,188 | 7/1956 | Yowell et al. | 71—2.3 |
| 2,765,224 | 10/1956 | Lambrech | 71—2.3 |
| 2,861,096 | 11/1958 | Pumpelly. | |
| 2,905,706 | 9/1959 | Sims et al. | 71—2.6 X |
| 2,993,934 | 7/1961 | Rosen | 71—2.6 X |
| 3,006,967 | 10/1961 | Newcomer et al. | 71—2.3 X |
| 3,136,810 | 6/1964 | Newcomer et al. | 71—2.6 X |

LEWIS GOTTS, *Primary Examiner.*